(12) United States Patent
Widera

(10) Patent No.: US 12,415,506 B2
(45) Date of Patent: Sep. 16, 2025

(54) METHOD AND SYSTEM FOR PREVENTING OR MITIGATING REAR-END COLLISIONS OF A MOTOR VEHICLE AND POTENTIAL MULTIPLE VEHICLE COLLISIONS

(71) Applicants: Hyundai Motor Company, Seoul (KR); Kia Corporation, Seoul (KR)

(72) Inventor: Christoph Widera, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 172 days.

(21) Appl. No.: 18/108,129

(22) Filed: Feb. 10, 2023

(65) Prior Publication Data
US 2024/0140406 A1    May 2, 2024

(30) Foreign Application Priority Data
Oct. 28, 2022    (DE) ................... 102022211449.3

(51) Int. Cl.
*B60W 30/09*    (2012.01)
*B60Q 1/50*    (2006.01)
(Continued)

(52) U.S. Cl.
CPC ............... *B60W 30/09* (2013.01); *B60Q 1/52* (2013.01); *B60Q 1/535* (2022.05);
(Continued)

(58) Field of Classification Search
CPC ............... B60W 30/09; B60W 10/182; B60W 30/0956; B60W 40/04; B60W 2420/403;
(Continued)

(56) References Cited

U.S. PATENT DOCUMENTS 9,633,560 B1 *    4/2017    Gao ................... G08G 1/07
2016/0167633 A1    6/2016    Lau
(Continued)

FOREIGN PATENT DOCUMENTS

CN           111196272 A       5/2020
DE    10 2014 226 109 B4    12/2014
(Continued)

*Primary Examiner* — Sohana Tanju Khayer
(74) *Attorney, Agent, or Firm* — MORGAN, LEWIS & BOCKIUS LLP

(57) ABSTRACT

A method for preventing or mitigating rear-end collisions of a motor vehicle and potential multiple vehicle collisions includes locating, by a sensor system of the motor vehicle, an obstructing vehicle in the front of the motor vehicle located on a trajectory of the motor vehicle, the obstructing vehicle being characterized by a speed below a predetermined first speed threshold, equal to zero; braking the motor vehicle, by an automatic braking system of the motor vehicle, to stop at a predetermined safety distance from the obstructing vehicle; monitoring, by the sensor system, the rear of the motor vehicle for a trailing vehicle approaching the motor vehicle from behind, wherein the sensor system is configured to detect driving information of the trailing vehicle; and performing safety measures by a control system of the motor vehicle in case a rear-end collision is anticipated based on the detected driving characteristics of the trailing vehicle.

11 Claims, 2 Drawing Sheets

(51) Int. Cl.
  *B60Q 1/52*     (2006.01)
  *B60W 10/18*    (2012.01)
  *B60W 30/095*   (2012.01)
  *B60W 40/04*    (2006.01)
  *G08G 1/16*     (2006.01)

(52) U.S. Cl.
  CPC ...... *B60W 10/182* (2013.01); *B60W 30/0956* (2013.01); *B60W 40/04* (2013.01); *G08G 1/16* (2013.01); *B60W 2420/403* (2013.01); *B60W 2420/408* (2024.01); *B60W 2554/4042* (2020.02); *B60W 2554/80* (2020.02); *B60W 2720/106* (2013.01); *B60W 2754/30* (2020.02)

(58) Field of Classification Search
  CPC ... B60W 2420/408; B60W 2554/4042; B60W 2554/80; B60W 2720/106; B60W 2754/30; B60W 10/10; B60W 2555/20; B60Q 1/52; B60Q 1/535; B60Q 1/46; B60Q 1/525; G08G 1/16
  See application file for complete search history.

(56) References Cited

U.S. PATENT DOCUMENTS

| | | | | |
|---|---|---|---|---|
| 2016/0207531 | A1* | 7/2016 | Kida | B60W 10/18 |
| 2018/0319379 | A1* | 11/2018 | Armstrong | B60T 7/14 |
| 2019/0329762 | A1* | 10/2019 | Kwon | B60W 30/0956 |
| 2019/0329779 | A1* | 10/2019 | D'sa | G06N 20/20 |
| 2020/0001871 | A1* | 1/2020 | Wang | B60W 40/04 |
| 2020/0361486 | A1* | 11/2020 | Mielenz | B60W 60/0015 |
| 2021/0013660 | A1* | 1/2021 | Markefka | H01R 13/42 |
| 2021/0094575 | A1* | 4/2021 | Sato | B60W 30/16 |
| 2021/0122373 | A1* | 4/2021 | Dax | B60W 30/18159 |
| 2021/0188264 | A1* | 6/2021 | Okuda | G08G 1/096791 |
| 2022/0250614 | A1* | 8/2022 | Ota | B60W 30/18163 |
| 2023/0041319 | A1* | 2/2023 | You | G08G 1/096791 |
| 2023/0077207 | A1* | 3/2023 | Hassan | G06N 3/08 |
| 2023/0162597 | A1* | 5/2023 | Tummala | G08G 1/163 701/117 |
| 2023/0182755 | A1* | 6/2023 | Kuehner | B60W 30/16 701/96 |
| 2023/0231604 | A1* | 7/2023 | Da Silva | H04B 17/318 375/267 |
| 2023/0242129 | A1* | 8/2023 | Xu | G06N 3/098 701/301 |
| 2023/0345249 | A1* | 10/2023 | Ansari | H04L 63/1441 |
| 2023/0356714 | A1* | 11/2023 | Baba | G08G 1/16 |
| 2023/0391333 | A1* | 12/2023 | Baba | B60W 30/09 |

FOREIGN PATENT DOCUMENTS

| | | |
|---|---|---|
| DE | 10 2012 005 867 B4 | 8/2018 |
| DE | 10 2018 218 719 A1 | 10/2018 |

* cited by examiner

METHOD AND SYSTEM FOR PREVENTING OR MITIGATING REAR-END COLLISIONS OF A MOTOR VEHICLE AND POTENTIAL MULTIPLE VEHICLE COLLISIONS

CROSS-REFERENCE TO RELATED APPLICATION

The present application claims priority to German Patent Application No. 102022211449.3, filed on Oct. 28, 2022, the entire contents of which is incorporated herein for all purposes by the present reference.

BACKGROUND OF THE PRESENT DISCLOSURE

Field of the Present Disclosure

The present disclosure pertains to a method and system for preventing or mitigating rear-end collisions of a motor vehicle and potential multiple vehicle collisions as well as to a motor vehicle with such a system.

Description of Related Art

Current motor vehicles are increasingly connected to sensors and telematics to implement advanced driver-assistance systems (ADAS) and/or autonomous driving functionalities. For example, cars may be provided with multiple sensors and various techniques for obtaining data from the environment, e.g., to provide accurate detection of other vehicles, of the road ahead and/or behind and the like. Typical technologies that are utilized for the present purpose include radar, laser, LiDAR, ultrasound, cameras, stereo vision, computer vision, odometry, accelerometers, gyroscopes, GPS, and the like. To produce a more consistent, accurate and useful view of the environment, a variety of such sensors may be provided on a vehicle and the information from these sensors may be combined within a sensor system.

Passive safety systems like airbags, deformation zones, pre-tensioned seatbelts and the like are provided to protect the occupants of a vehicle and other road users when a collision or crash occurs. Amongst others, they are designed to reduce the impact of an accident and to mitigate the consequences during and after impact. With regard to rear-end collisions, such systems are usually developed and tested under the assumption that the vehicle transmission is set to neutral and that the parking brake is deactivated, which implies that the impact force does not have to be absorbed completely by the vehicle as there is some space in the front of the vehicle into which it can move and decelerate.

However, modern vehicles have automatic parking brakes that engage automatically when the vehicle comes to a halt. The impact energy in the instant case may be higher compared to a rear impact with a vehicle with released parking brake. Moreover, when reaching the end of a traffic jam, drivers tend to keep a relatively short distance to the vehicles ahead (e.g., less than a vehicle length). Modern vehicles with distance assist systems such as Smart Cruise Control often feature a similar behavior. Most passive safety systems are designed to be actuated only once, which may get relevant in case a vehicle should get pushed into one or several other vehicles due to a rear-end collision.

Document DE 10 2014 226 109 B4 describes a method for triggering self-braking in a motor vehicle, in which, after an initial collision during an accident, a request signal for self-braking is transmitted by a collision sensor unit in the motor vehicle via a communication device of the motor vehicle.

Document DE 10 2018 218 719 A1 relates to a method for reacting to a collision of an at least partially automated motor vehicle with an object in an environment of the motor vehicle.

Document DE 10 2012 005 867 B4 describes a method for the preventive protection of occupants of a vehicle from a collision, in which a control device triggers a braking operation of the vehicle and is configured to control an active chassis element to trigger a pitching motion of the vehicle to couple the occupants to their seats. Moreover, the control device may trigger an evasive steering intervention for the present purpose.

The information included in the present Background of the present disclosure is only for enhancement of understanding of the general background of the present disclosure and may not be taken as an acknowledgement or any form of suggestion that the present information forms the prior art already known to a person skilled in the art.

BRIEF SUMMARY

Various aspects of the present disclosure are directed to providing solutions with improved safety in regard to rear-end collisions of vehicles.

Various aspects of the present disclosure are directed to providing a method for preventing or mitigating rear-end collisions of a vehicle and potential multiple vehicle collisions, a system for preventing or mitigating rear-end collisions of a vehicle and potential multiple vehicle collisions, and a motor vehicle with the system.

According to one aspect of the present disclosure, a method for preventing or mitigating rear-end collisions of a motor vehicle and potential multiple vehicle collisions includes locating, by a sensor system of the motor vehicle, an obstructing vehicle in the front of the motor vehicle located on a trajectory of the motor vehicle, the obstructing vehicle being characterized by a speed below a predetermined first speed threshold, equal to zero; braking the motor vehicle, by an automatic braking system of the motor vehicle, to stop at a predetermined safety distance from the obstructing vehicle; monitoring, by the sensor system of the motor vehicle, the rear of the motor vehicle for a trailing vehicle approaching the motor vehicle from behind, wherein the sensor system is configured to detect driving information of the trailing vehicle; and performing predetermined safety measures by a control system of the motor vehicle in case a rear-end collision is anticipated based on the detected driving characteristics of the trailing vehicle.

According to another aspect of the present disclosure, a system for preventing or mitigating rear-end collisions of a motor vehicle and potential multiple vehicle collisions includes a sensor system configured to locate an obstructing vehicle in the front of the motor vehicle located on a trajectory of the motor vehicle, the obstructing vehicle being characterized by a speed below a predetermined first speed threshold, equal to zero, and configured to monitor the rear of the motor vehicle for a trailing vehicle approaching the motor vehicle from behind, wherein the sensor system is configured to detect driving characteristics of the trailing vehicle; an automatic braking system configured to brake the motor vehicle to stop at a predetermined safety distance from the obstructing vehicle; and a control system configured to perform predetermined safety measures in case a rear-end collision is anticipated based on the detected driving characteristics of the trailing vehicle.

According to yet another aspect of the present disclosure, a motor vehicle includes a system according to the present disclosure.

One idea of the present disclosure is to recognize a standing or slowly moving obstructing vehicle, which may indicate the end of a traffic jam, and come to a halt at a safety distance from it to be able to warn vehicles approaching from behind and to maintain reaction capabilities in case that a rear-end collision is possible. To the present end, the now standing motor vehicle surveils the rear-facing area for oncoming vehicles based on state-of-the-art ADAS sensors including, for example, rear corner radar, rear cameras, LiDAR etc. The control system of the motor vehicle analyses the data from the sensor system and is then able to react optimally for every situation so that suitable security measures may be initiated as far as necessary. In that vein, rear-end collisions may be prevented or at least mitigated. Multiple vehicle collisions may be completely avoided.

It is understood that the term "vehicle" or "vehicular" or other similar term as used herein is inclusive of motor vehicles in general such as passenger vehicles including sports utility vehicles (SUV), buses, trucks, various commercial vehicles, and the like, and includes hybrid vehicles, electric vehicles, plug-in hybrid electric vehicles, hydrogen-powered vehicles and other alternative fuel vehicles (e.g., fuels determined from resources other than petroleum). As referred to herein, a hybrid vehicle is a vehicle that has two or more sources of power, for example both gasoline-powered and electric-powered vehicles.

Advantageous embodiments and improvements of the present disclosure are found in the subordinate claims.

According to an exemplary embodiment of the present disclosure, the safety distance may amount to at least several vehicle lengths of the motor vehicle.

Thus, the safety distance may be chosen significantly greater than usually to retain maximum freedom of action for suitable security measures and to provide a space large enough for the absorption of a potential impact and for the necessary deceleration to the front.

According to an exemplary embodiment of the present disclosure, the safety distance may be set dynamically based on an expected location-, road- and/or weather-dependent speed of potential trailing vehicles. Additionally, or alternatively the safety distance may be set dynamically based on current traffic flow in the vicinity of the motor vehicle.

Hence, the safety may be chosen larger in case the motor vehicle comes to halt on a highway compared to a situation within an urban environment, for example, where vehicles are only allowed to drive relatively slowly. Moreover, the weather, road conditions, traffic flow and similar factors may also be taken into account.

According to an exemplary embodiment of the present disclosure, the predetermined safety measures may include activating hazard lights of the motor vehicle.

Hence, the motor vehicle automatically warns the trailing vehicle that there is an obstruction on the road, which may indicate, for example, the end of a traffic jam. The trailing vehicle may then react accordingly and initiate adequate measures.

According to an exemplary embodiment of the present disclosure, the predetermined safety measures may include bringing the motor vehicle into driving gear and/or accelerating the motor vehicle before the collision so that a reduced differential speed between the motor vehicle and the trailing vehicle is achieved before collision.

This is beneficial in case the safety distance is set to relatively large values, e.g., 30 m, 50 m, 70 m or even more, in which case the vehicle can engage its driving gear and accelerate for a short time period to reduce the differential speed at impact before a slow deceleration is induced.

According to an exemplary embodiment of the present disclosure, the predetermined safety measures may include bringing the motor vehicle into neutral gear and/or releasing a parking brake of the motor vehicle to mitigate an impact severity of the collision.

This may be beneficial, for example, in cases where the safety distance is not as large as above (i.e., not large enough to allow acceleration measures). The impact severity may be reduced based on the present procedure so that the motor vehicle comes to a halt before reaching the obstructing vehicle, and hence multiple vehicle collisions are prevented.

According to an exemplary embodiment of the present disclosure, the predetermined safety measures include assessing, by the sensor system of the motor vehicle, whether the motor vehicle is unoccupied. The predetermined safety measures may further comprise, in case the motor vehicle is assessed to be unoccupied, engaging a parking gear of the motor vehicle and/or activating a parking brake of the motor vehicle to form a barrier with the motor vehicle for preventing the multiple vehicle collisions.

In case that all occupants have left the vehicle, the vehicle may act as barrier through the engagement of parking gear and parking brake to increase safety of the obstructing vehicle and potential other vehicles further in the front as well as other traffic participants.

According to an exemplary embodiment of the present disclosure, the detected driving characteristics may include current speed and distance of the trailing vehicle. When the current speed falls below a distance-dependent second speed threshold, the predetermined safety measures may include reducing the safety distance of the motor vehicle to support traffic flow.

Hence, the motor vehicle may react in accordance with the speed of the trailing vehicle. when the trailing vehicle approaches at a relatively high speed, there may be an increased risk of collision. In that case, the motor vehicle may have to initiate predetermined safety measures, e.g., activation of hazard lights, releasing of parking brake etc. However, when the trailing vehicle approaches at a reduced lower speed, e.g., because it has already started to slow down noticeably, or even comes to a halt at a predetermined distance from the motor vehicle, the motor vehicle may reduce the safety distance to the obstructing vehicle to ensure traffic flow (e.g., in a traffic jam situation).

More generally, the control system of this system may be configured to dynamically adapt the safety distance in accordance with the respective situation, and in accordance with predetermined driving parameters of the obstructing vehicle (or, more generally, of the vehicles on the road ahead) and/or any trailing vehicles.

The present disclosure will be explained in greater detail with reference to exemplary embodiments depicted in the drawings as appended.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
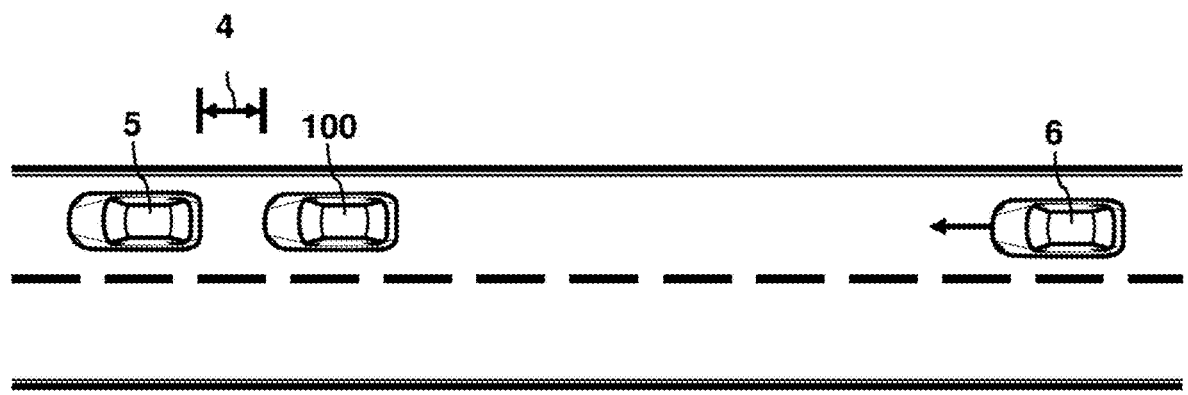
FIG. 1 schematically depicts an exemplary driving situation.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

FIG. 1 schematically depicts an exemplary driving situation.

In the present example, a motor vehicle 100 has come to halt behind an obstructing vehicle 5, e.g., at the end of a traffic jam, at a typical safety distance 4 which is about a vehicle length or (significantly) smaller. Another vehicle 6 is approaching at a relatively high speed from behind so that a potential rear-end collision situation arises.

In case that the motor vehicle 100 stands with released parking brake and transmission set to neutral, its freedom of movement is not hindered. Thus, in case of an impact from behind, it can in principle move freely to the front within the safety distance, which will help to absorb some of the impact forces and thus reduce the potential deformation for both vehicles 100, 6.

However, because the safety distance 4 is relatively short, the motor vehicle 100 may be pushed into the obstructing vehicle 5, potentially triggering multiple vehicle collisions resulting in increased damages, to the motor vehicle 100, compared to a situation where it can freely decelerate into free space.

In case that the parking brake is engaged and/or the transmission is set to parking, the forces on the motor vehicle 100 may be even larger at impact. In combination with an insufficient safety distance this may lead to an inacceptable situation.

Figure 2:
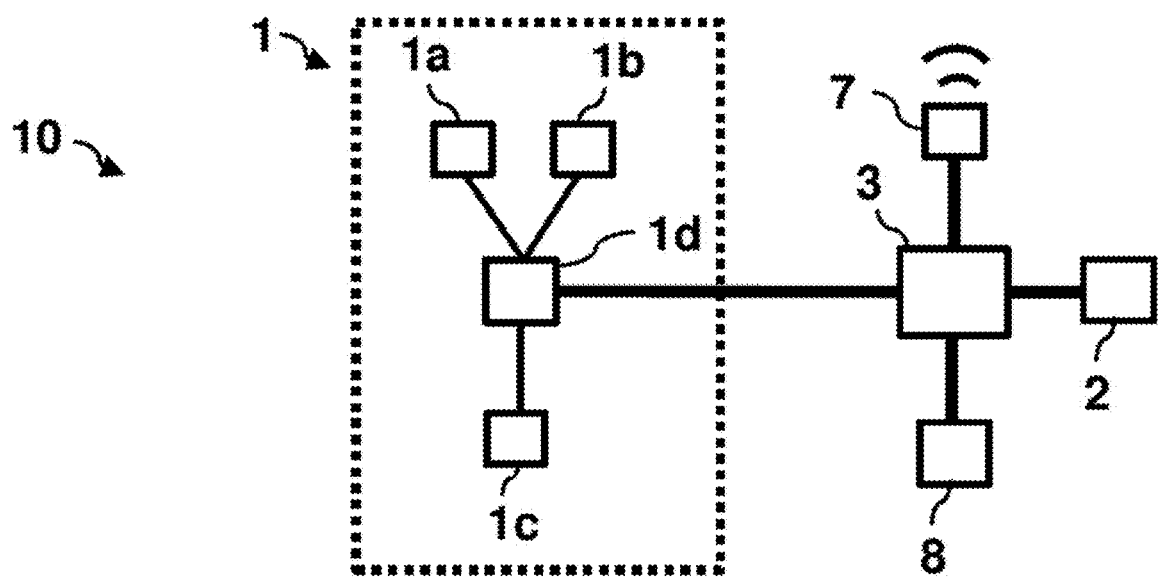
FIG. 2 schematically shows a system for preventing or mitigating rear-end collisions of a motor vehicle and potential multiple vehicle collisions according to an exemplary embodiment of the present disclosure.

FIG. 2 schematically shows a system 10 for preventing or mitigating rear-end collisions of a motor vehicle 100 and potential multiple vehicle collisions according to an exemplary embodiment of the present disclosure, which is provided to remedy the above detailed drawbacks.

Figure 4:
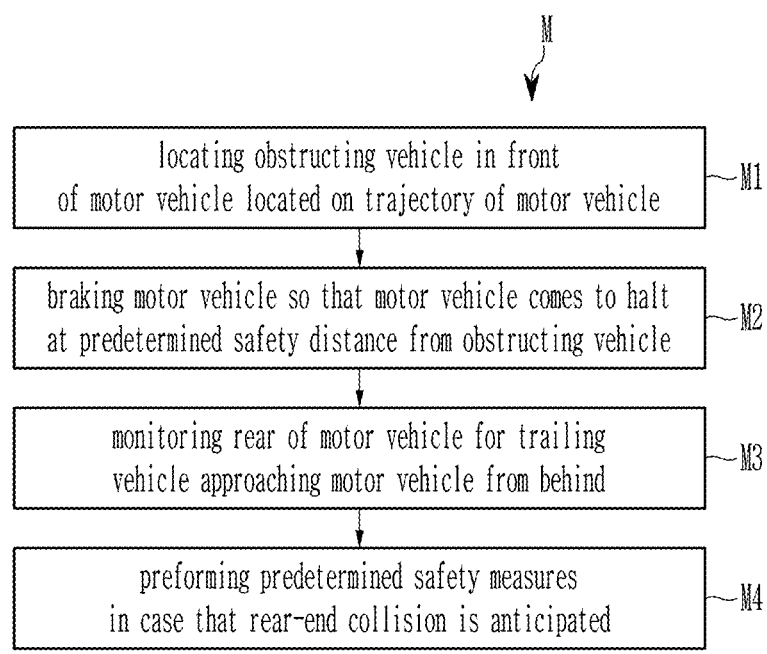
FIG. 4 shows a flow diagram of a method for preventing or mitigating rear-end collisions of a motor vehicle and potential multiple vehicle collisions as employed by the system of FIG. 2.

FIG. 4 shows a flow diagram of a method M for preventing or mitigating rear-end collisions of a motor vehicle 100 and potential multiple vehicle collisions as employed by the system 10 of FIG. 2.

The method M includes under M1 locating, by a sensor system 1 of the motor vehicle 100, an obstructing vehicle 5 in the front of the motor vehicle 100 located on a trajectory of the motor vehicle 100, the obstructing vehicle 5 having a speed below a predetermined first speed threshold. For example, the speed of the obstructing vehicle 5 may be zero or very small (i.e., walking pace or slightly above). The obstructing vehicle 5 may form the end of a traffic jam.

The sensor system 1 is part of the safety system 10 of the motor vehicle 100, which in turn may be part of and/or coupled to a determining system of the vehicle 100, e.g., an advanced driver assistance system (ADAS) and/or an automated driving system. To the present end, the safety system is controlled by a control system 3 of the motor vehicle 100, e.g., an electronic control unit. The system 10 may generally be configured to scan a traffic environment around the vehicle 100. To the present end, the sensor system 1 may be provided with various sensor technologies as they are utilized in modern vehicles, in assisted and/or autonomous driving systems, e.g., sensors to detect other vehicles, pedestrians, bicycles and other traffics participants and/or objects (e.g., radars, cameras, ultrasonic sensors, etc.), as well as with wireless communication equipment for Vehicle TO-Everything (V2X) communication.

With reference to FIG. 2, the system 10 includes a sensor system 1 controlled by a sensor control 1d and configured to determine driving parameters of other vehicles, vehicles driving close by in the front and back of the motor vehicle 100, e.g., position, speed, acceleration, direction of movement and the like. To the present end, the system 1 may be provided with various sensor elements including amongst others one or several radars 1a, LiDARs 1b and/or cameras 1c. It is to be understood that the system 1 may also include further sensor elements that are not depicted here.

The control system 3 may be communicatively coupled to the sensor system 1 as indicated in FIG. 2 and may further be coupled to a communication unit 7 of the vehicle 100 as well as to an operator interface 8 for interaction with a driver or other occupant of the motor vehicle 100.

Referring to FIG. 4, the method M further includes under M2 braking the motor vehicle 100 by an automatic braking system 2 being controlled by the control system 3 so that the motor vehicle 100 comes to a halt at a predetermined safety distance 4 from the obstructing vehicle. The safety distance 4 in the instant case is chosen relatively large, e.g., at least several vehicle lengths of the motor vehicle 100. It may be set based on an expected location-dependent speed and/or road-dependent speed of potential trailing vehicles 6. For example, the safety distance 4 may be significantly larger on a highway than on a city road or a restricted traffic area with reduced speed limit.

Figure 3:
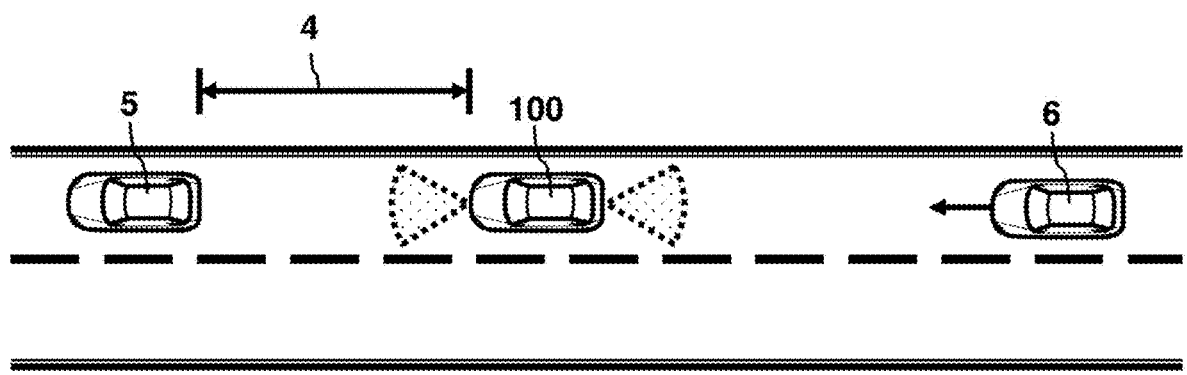
FIG. 3 schematically shows the driving situation of FIG. 1 utilizing the system of FIG. 2.

FIG. 3 schematically shows the driving situation of FIG. 1 utilizing the system 10 of FIG. 2. As may be seen here, the safety distance 4 is much greater than usual. Moreover, the motor vehicle 100 scans its environment to the front and back for potential obstacles as well as for vehicles 6 approaching from the back.

Accordingly, the method M further includes under M3 monitoring, by the sensor system 1 of the motor vehicle 100, the rear of the motor vehicle 100 for a trailing vehicle 6 approaching the motor vehicle 100 from behind, wherein the sensor system 1 detects driving characteristics of the trailing vehicle 6 like speed, distance, driving direction and the like thereof.

Finally, the method M includes under M4 performing predetermined safety measures by the control system 3 of the motor vehicle 100 in case that a rear-end collision is anticipated based on the detected driving characteristics of the trailing vehicle.

In accordance with the specific situation, the motor vehicle 100 may initiate one or several different safety measures or combination of such measures. The respective measures may depend on the driving parameters of the trailing vehicle 6.

For example, when the trailing vehicle 6 approaches at a relatively high speed from behind and/or noticeably reduces it speed while approaching the motor vehicle 100, the motor vehicle 100 may start to reduce its safety distance 4 accordingly so as to support traffic flow, e.g., at the end of a traffic jam, as the risk of any collision is reduced.

If, on the other hand, the speed of the trailing vehicle 6 is relatively high so that a collision seems possible without initiation of adequate measures, the motor vehicle 100 may react accordingly by one of the following countermeasures.

In a first step, the motor vehicle 100 may activate hazard lights thereof to warn the trailing vehicle 6 about the end portion of the traffic jam.

In accordance with the specific length of the safety distance 4, the type of road and other situational parameters, the motor vehicle 100 may initiate additionally various different safety measures.

For example, in case of a large safety distance 4, the measures may include bringing the motor vehicle 100 into driving gear and accelerating the motor vehicle 100 before the collision so as to achieve a reduced differential speed between the motor vehicle 100 and the trailing vehicle 6 before collision.

If the safety distance 4 is not large enough for the above measure, the motor vehicle 100 may also be brought into neutral gear and the parking brake may be released so that an impact severity of the collision is at least mitigated.

It may happen that all occupants have left the vehicle 100, which may be detected by the sensor system 1. In that case, the parking gear of the motor vehicle 100 may be engaged and the parking brake may be activated so that the vehicle 100 may form a barrier to prevent multiple vehicle collisions.

It is to be understood that the person of skill may also readily conceive further measures for increasing safety in the above situation. For example, the motor vehicle 100 may be provided with V2X or V2V communication means to communicate with other vehicles, in trailing vehicles 6, as well as with infrastructure units distributed along the road. Via such communication links, the vehicles may exchange data on approaching and/or obstructing vehicles, which may or may not be provided with a system as described above, including information on the dynamics of the respective vehicles, that is, their position, speed and projected driving path amongst others, as well as about potential obstacles. These data may then be taken into account by the receiving vehicles for initiating adequate counter measures.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data non-transitory storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data non-transitory storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain predetermined principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for preventing or mitigating rear-end collisions of a vehicle and potential multiple vehicle collisions, the method including:
   locating, by a sensor system of the vehicle, an obstructing vehicle in front of the vehicle on a trajectory of the vehicle, the obstructing vehicle having a speed below a predetermined first speed threshold;
   braking the vehicle, by an automatic braking system of the vehicle, to stop at a predetermined safety distance from the obstructing vehicle;
   monitoring, by the sensor system of the vehicle, a trailing vehicle approaching the vehicle in rear of the vehicle, wherein the sensor system is configured to detect driving information of the trailing vehicle; and
   performing, by a control system electrically connected to the sensor system, predetermined safety measures when a rear-end collision is anticipated based on the detected driving information of the trailing vehicle,
   wherein the predetermined safety distance is set based on at least one of:
      an expected speed of potential trailing vehicles, which is determined based on at least one of a location, a road or a weather in which the potential trailing vehicles are driving, and
      current traffic flow in a vicinity of the vehicle,
   wherein the detected driving information include a current speed of the trailing vehicle and a current distance of the trailing vehicle from the vehicle, and
   wherein when the current speed falls below a predetermined second speed threshold, the predetermined safety measures include reducing the predetermined safety distance of the vehicle to support traffic flow.

2. The method of claim 1, wherein the predetermined safety measures include activating hazard lights of the vehicle.

3. The method of claim 1, wherein the predetermined safety measures include at least one of:
   bringing the vehicle into a state of driving gear shifting, and
   accelerating the vehicle before the rear-end collision to reduce a speed difference between the vehicle and the trailing vehicle before the rear-end collision.

4. The method of claim 1, wherein the predetermined safety measures include at least one of:
   bringing the vehicle into a state of neutral gear shifting, and
   releasing a parking brake of the vehicle to mitigate an impact caused by the rear-end collision.

5. The method of claim 1, wherein the predetermined safety measures include: assessing, by the sensor system of the vehicle, whether the vehicle is unoccupied, and
   when the vehicle is assessed to be unoccupied, performing, by the control system, at least one of engaging a parking gear of the vehicle and activating a parking brake of the vehicle to form a barrier with the vehicle for preventing the multiple vehicle collisions.

6. A system for preventing or mitigating rear-end collisions of a vehicle and potential multiple vehicle collisions, the system comprising:
   a sensor system configured to locate an obstructing vehicle in front of the vehicle on a trajectory of the vehicle, the obstructing vehicle having a speed below a predetermined first speed threshold, and configured to monitor a trailing vehicle approaching the vehicle in rear of the vehicle, wherein the sensor system is configured to detect driving information of the trailing vehicle;
   an automatic braking system configured to brake the vehicle to stop at a predetermined safety distance from the obstructing vehicle; and
   a control system electrically connected to the sensor system and configured to perform predetermined safety measures when a rear-end collision is anticipated based on the detected driving information of the trailing vehicle,
   wherein the predetermined safety distance is set based on at least one of:
      an expected speed of potential trailing vehicles, which is determined based on at least one of a location, a road or a weather in which the potential trailing vehicles are driving, and
      current traffic flow in a vicinity of the vehicle,
   wherein the detected driving information include a current speed of the trailing vehicle and a current distance of the trailing vehicle from the vehicle, and
   wherein when the current speed falls below a predetermined second speed threshold, the predetermined safety measures include reducing the predetermined safety distance of the vehicle to support traffic flow.

7. The system of claim 6, wherein the predetermined safety measures include activating hazard lights of the vehicle.

8. The system of claim 6, wherein the predetermined safety measures include at least one of:
   bringing the vehicle into a state of driving gear shifting, and
   accelerating the vehicle before the rear-end collision to reduce a speed difference between the vehicle and the trailing vehicle before the rear-end collision.

9. The system of claim 6, wherein the predetermined safety measures include at least one of:
   bringing the vehicle into a state of neutral gear shifting, and
   releasing a parking brake of the vehicle to mitigate an impact caused by the rear-end collision.

10. The system of claim 6, wherein the predetermined safety measures include:
   assessing, by the sensor system of the vehicle, whether the vehicle is unoccupied, and when the vehicle is assessed to be unoccupied, performing, by the control system, at least one of engaging a parking gear of the vehicle and activating a parking brake of the vehicle to form a barrier with the vehicle for preventing the multiple vehicle collisions.

11. The vehicle with the system of claim 6.

* * * * *